US009618985B2

(12) United States Patent
Fan et al.

(10) Patent No.: US 9,618,985 B2
(45) Date of Patent: Apr. 11, 2017

(54) DATA STORAGE SECURING MECHANISM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yong-Chang Fan, Wuhan (CN); San-Yong Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/716,399

(22) Filed: May 19, 2015

(65) Prior Publication Data

US 2016/0216747 A1   Jul. 28, 2016

(30) Foreign Application Priority Data

Jan. 28, 2015 (CN) .......................... 2015 1 0042866

(51) Int. Cl.
*H05K 5/02* (2006.01)
*G06F 1/18* (2006.01)
*F16B 2/10* (2006.01)

(52) U.S. Cl.
CPC ................ *G06F 1/187* (2013.01); *F16B 2/10* (2013.01)

(58) Field of Classification Search
CPC ........ G06F 1/187; G06F 1/183; G06F 13/409; G06F 1/181; H05K 5/0021; H05K 5/0221; H05K 7/14; F16B 2/10
USPC ....................... 361/679.33–679.39, 724–727; 312/223.1–223.2
See application file for complete search history.

(56) References Cited

U.S. PATENT DOCUMENTS

| 2005/0057895 A1* | 3/2005 | Chen ....................... G06F 1/187 361/679.33 |
| 2012/0134093 A1* | 5/2012 | Lu ........................ G11B 33/124 361/679.33 |

* cited by examiner

*Primary Examiner* — Anthony Haughton
*Assistant Examiner* — Ingrid Wright
(74) *Attorney, Agent, or Firm* — Zhigang Ma

(57) ABSTRACT

A data storage device securing mechanism is used to secure a data storage device on a board. The data storage device securing mechanism includes a bracket secured on the board, a pivot shaft secured on the bracket, and a latch piece rotatably installed on the pivot shaft. The bracket includes a plurality of sliding grooves. The latch piece includes a latch portion. The data storage device is configured to be slidably installed on the sliding groove. The latch piece is configured to be rotated and be received in the sliding groove. The latch portion is configured to be resisted against the data storage device to secure the data storage device on the bracket.

20 Claims, 6 Drawing Sheets

DATA STORAGE SECURING MECHANISM

CROSS-REFERENCE TO RELATED APPLICATIONS

This application claims priority to Chinese Patent Application No. 201510042866.3 filed on Jan. 28, 2015, the contents of which are incorporated by reference herein.

FIELD

The subject matter herein generally relates to securing mechanisms, and more particularly to a data storage device securing mechanism.

BACKGROUND

With the development of science and technology, the computer is widely used. The data storage device, such as optical disk driver is an important component of the computer. A data storage device securing mechanism is usually used in the computer to secure the data storage device. However, because of the complex structure design of the data storage device securing mechanism, it often needs tools to be assembled or disassembled.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
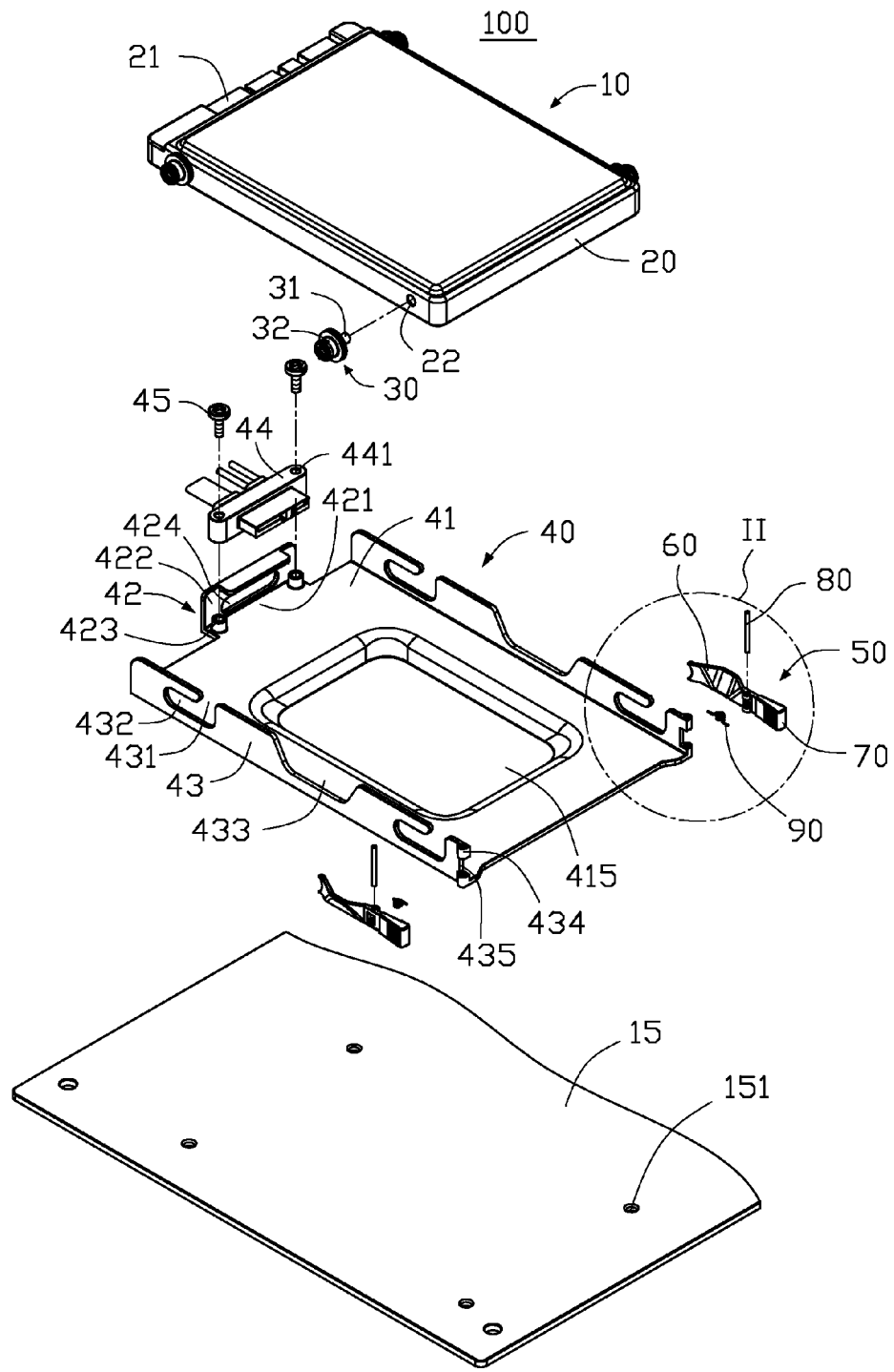
FIG. 1 is an isometric, exploded view of an embodiment of a data storage device securing mechanism, a data storage device and a board.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates one embodiment of a data storage device securing mechanism 100 configured to secure a data storage device 10 and configured to be secured on a board 15. The data storage device securing mechanism 100 includes a bracket 40 and two securing modules 50.

The data storage device 10 includes a main body 20 and four positioning members 30 configured to be secured to the main body 20. The main body 20 defines two limiting holes 22 in each of the two opposite sidewalls. An interface 21 is located on a rear end of the main body 20. The positioning member 30 includes a pin 31 and a sliding portion 32 connected to the pin 31. The pin 31 can be inserted into the limiting hole 22 to secure the positioning member 30 on the main body 20. The board 15 defines four securing holes 151.

Figure 2:
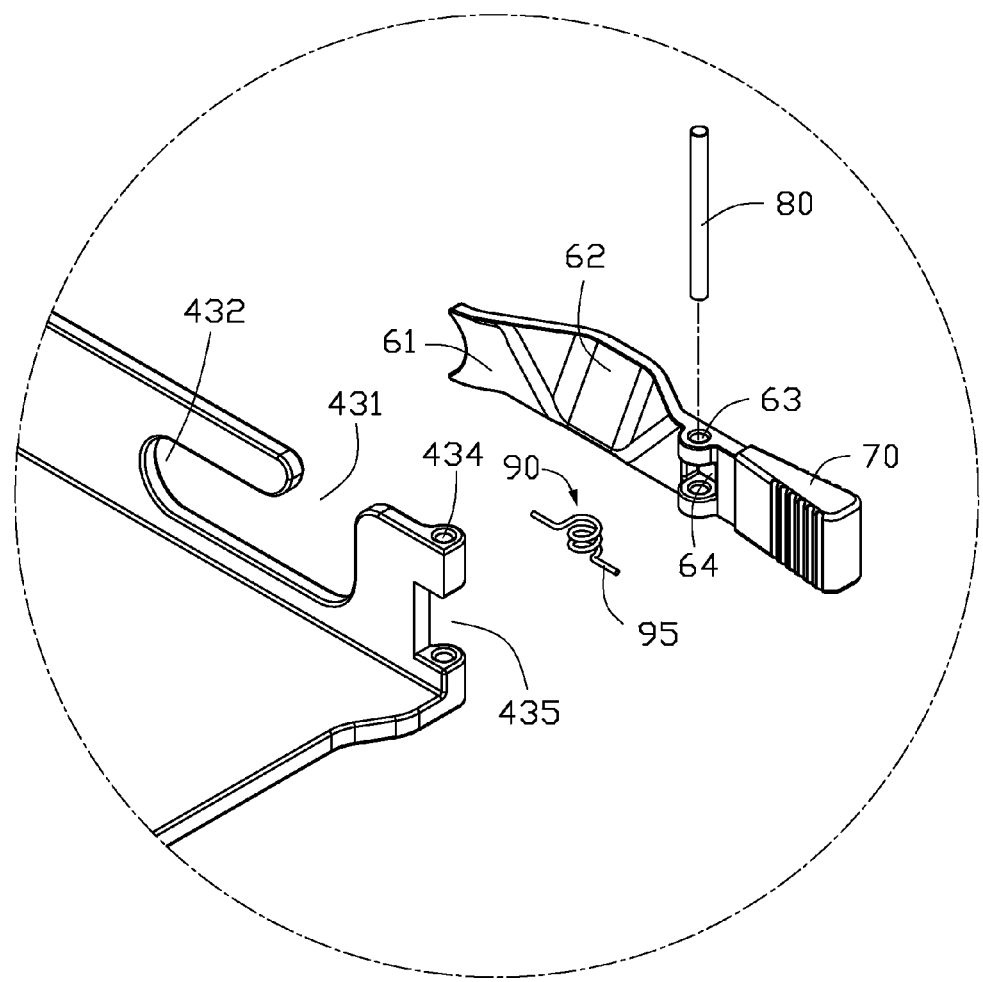
FIG. 2 is an enlarged view of a circled portion II of FIG. 1.
Figure 3:
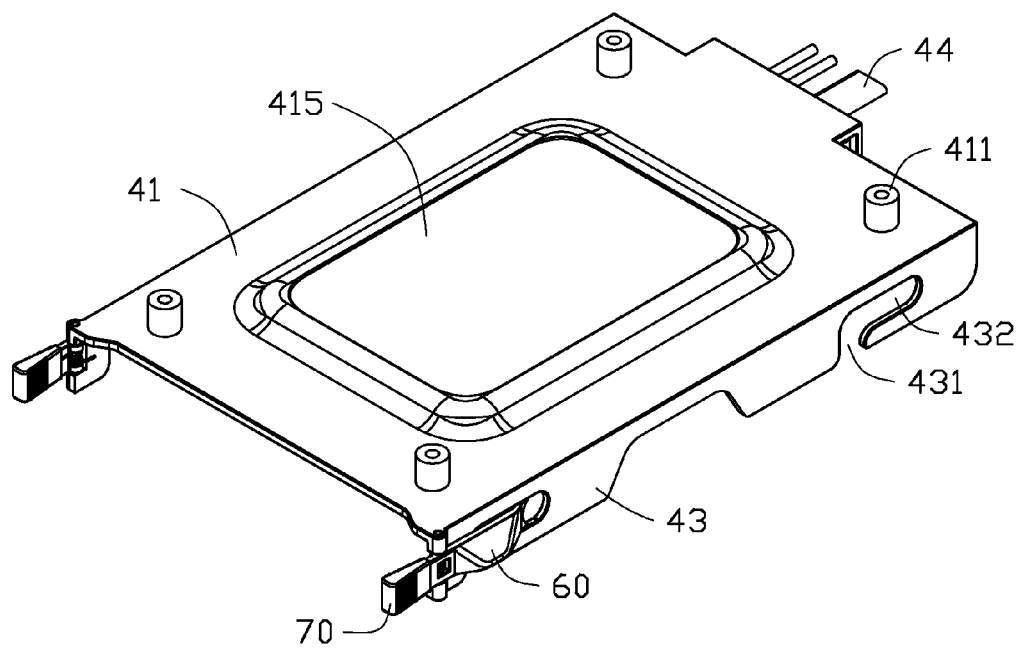
FIG. 3 is an isometric, assembled view of the data storage device securing mechanism of FIG. 1.

FIGS. 1 to 3 illustrate that the bracket 40 includes a bottom plate 41, a mounting portion 42, and two securing plates 43. The bottom plate 41 defines an opening 415. Four positioning posts 411, each defining a hole, are secured to a bottom surface of the bottom plate 42.

The mounting portion 42 includes a connecting plate 421 and a stopper plate 422. The connecting plate 421 is extends from a rear edge of the bottom plate 41, and the stopper plate 422 substantially perpendicular extends from the connecting plate 421. The connecting plate 421 defines two positioning holes 423. The stopper plate 422 defines a through hole 424, which is configured for receiving a connector 44. The connector 44 can be inserted into the interface 21 to be connected with the data storage device 10. Each side of the connector 44 defines a latch hole 441. Two securing pieces 45 can pass through the latch hole 441 and be inserted into the positioning hole 423 to secure the connector 44 on the mounting portion 42.

The two securing plates 43 are located on opposite two side edges of the bottom plate 41. Two entrances 431 are defined in each securing plate 43. Two sliding grooves 432 are defined in each securing plate 43 communicating between the two entrances 431 respectively. The securing plate 43 defines an operating opening 433 adjacent the middle position. A receiving hole 434 and a receiving cutout 435 are defined in a front end of each securing plate 43.

FIGS. 1 and 2 illustrate that the securing module 50 includes a latch piece 60, an operating handle 70 set on the latch piece 60, a pivot shaft 80 and a torsion spring 90 which is set on the pivot shaft 80. One end of the latch piece 60 is equipped with a latch portion 61. The latch piece 60 adjacent the latch portion 61 concaves outwards and defines a guiding groove 62. The latch piece 60 adjacent the guiding groove 62 defines two pivot holes 63. A pivot portion 64 is located between the two pivot holes 63. Two pivot holes 63 can be aligned with the receiving hole 434 and be received in the receiving cutout 435. The operating handle 70 is set on another end of the latch piece 60.

The pivot shaft 80 is inserted into the receiving hole 434 and the pivot hole 63 to rotatably install the latch piece 60 on the bracket 40. The torsion spring 90 can be set on the pivot shaft 80 and be received in the pivot portion 64. The torsion spring 90 includes two torsion arms 95, which are respectively rested on the securing plate 43 and the latch piece 60.

Figure 4:
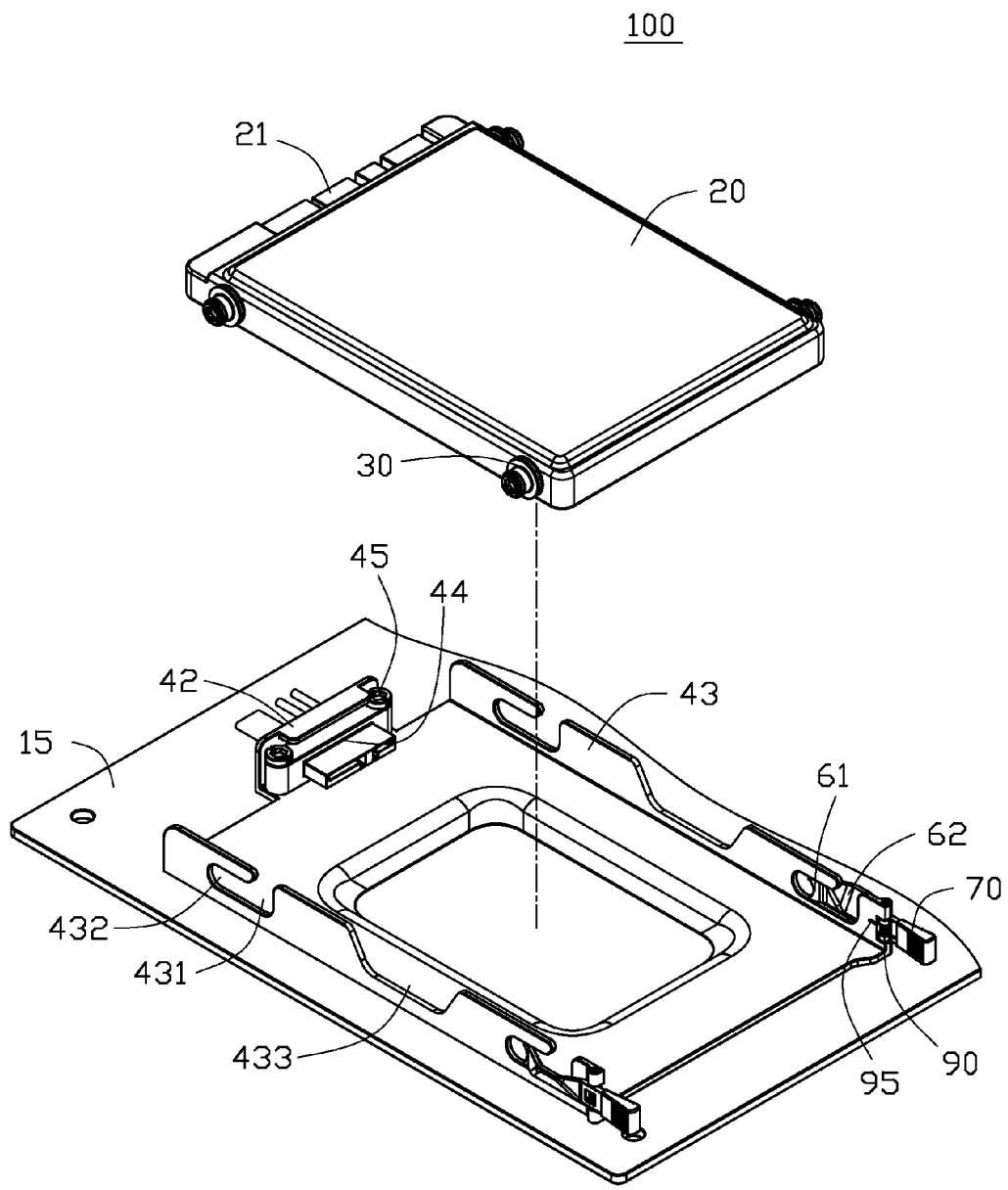
FIG. 4 is an isometric, partially assembled view of the data storage device securing mechanism, the data storage device and the board of FIG. 1.
Figure 5:
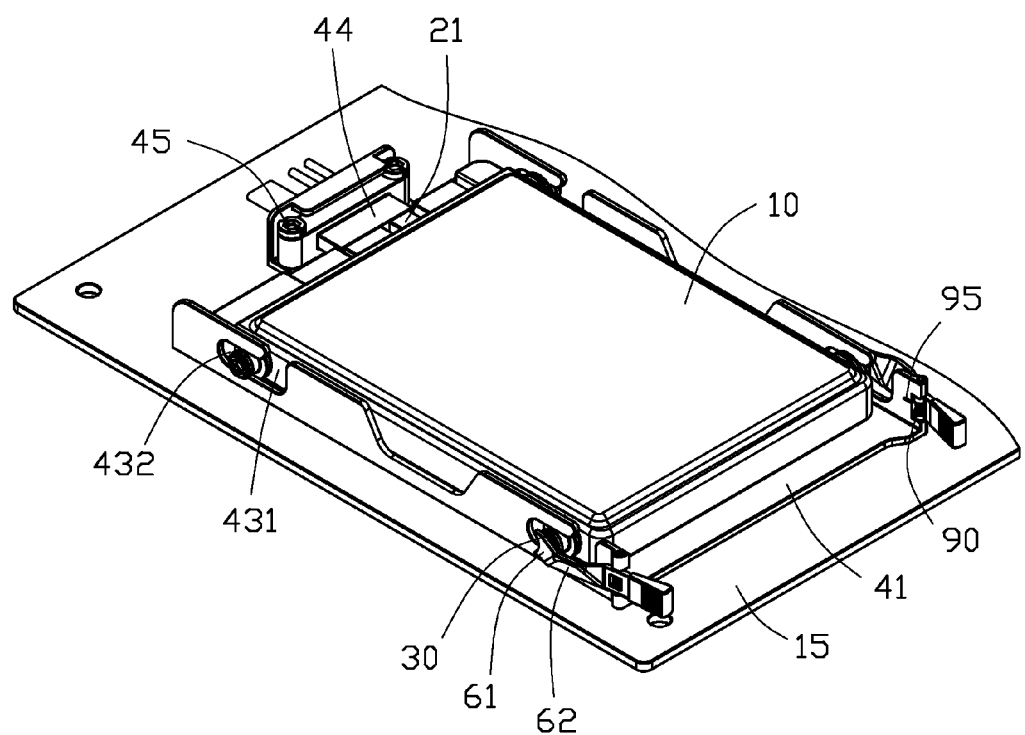
FIG. 5 is an isometric, assembled view of the data storage device, the data storage device securing mechanism and the board of FIG. 4.
Figure 6:
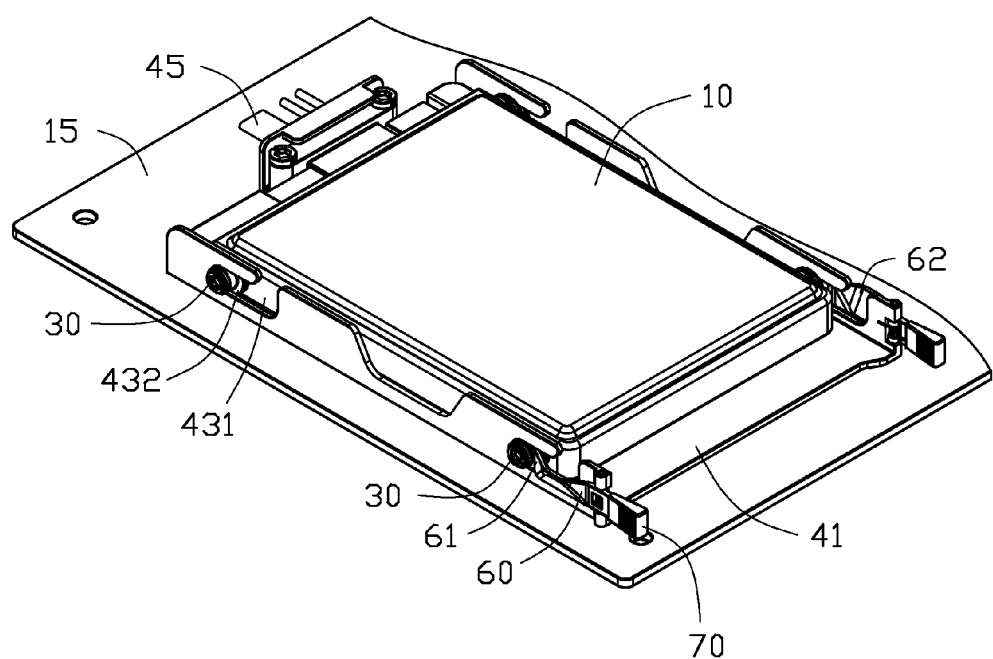
FIG. 6 is similar to FIG. 5, but shown from a different angle and the data storage device is received in the data storage device securing mechanism.

FIGS. 4 to 6 illustrate when in assembly, the pin 31 of the positioning member 30 is inserted into the limiting hole 22 of the main body 20. Then, the data storage device 10 is completely assembled. The connector 44 passes through the through hole 424 and is received in the mounting portion 42. Two latch holes 441 are aligned with the positioning hole 423. The securing piece 45 passes through the latch hole 441 and is inserted into the positioning hole 423 to secure the connector 44 in the mounting portion 42.

Two pivot holes 63 are placed in the receiving cutout 435 and are aligned with the receiving hole 434. The torsion spring 90 is placed in the pivot portion 64. The pivot shaft 80 passes through the receiving hole 434, the pivot hole 63 and the torsion spring 90 to rotatably install the latch piece 60 on the bracket 40. Two torsion arms 95 of the torsion spring 90 are respectively rested on the securing plate 43 and the latch piece 60. The latch portion 61 is received in the sliding groove 432 under a driven force of the torsion spring 90. Then, the securing module 50 is mounted on the bracket 40. The data storage device securing mechanism 100 is completely assembled.

The bracket 40 is placed on the board 15. The positioning posts 411 are aligned with the securing holes 151. A plurality of fasteners (not shown) pass through the positioning posts 411 and are inserted into the securing holes 151 to secure the bracket 40 to the board 15. The data storage device 10 is placed on the bracket 40 and the positioning member 30 is placed on the entrance 431 of the securing plate 43. The sliding portion 32 of the positioning member 30 is slid to the sliding groove 432 under guidance of the guiding groove 62.

The data storage device 10 is pushed along an extending direction of the sliding groove 432. The sliding portion 32 of the positioning member 30 is slid in the sliding groove 432. Two of the positioning members 30 press the latch portion 61. The latch piece 60 is rotated to be removed from the sliding groove 432 under pressure of the positioning member 30. Two torsion arms 95 are close to each other to let the torsion spring 90 elastically compress. When the positioning member 30 is slid to the bottom of the sliding groove 432, the positioning member 30 is removed from the latch portion 61. The torsion spring 90 is elastically recovered to let the torsion arm 95 rotate the latch piece 60. The latch portion 61 is received in the sliding groove 432 and is rested on the positioning member 30 to secure the positioning member 30 in the sliding groove 432. The connector 44 is inserted into the interface 21 and the data storage device 10 is secured on the board 15.

When the data storage device 10 needs to be detached, the operating handles 70 of two securing modules 50 are pressed to rotate the latch piece 60 to be removed from the sliding groove 432. The positioning member 30 can be slid to the entrance 431 along the sliding groove 432. Then, the data storage device 10 is latched at the operating opening 433 and can be removed from the data storage device securing mechanism 100.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A data storage device securing mechanism comprising:
   a bracket secured on a board and defining a sliding groove;
   a pivot shaft secured on the bracket;
   a latch piece rotatably installed on the pivot shaft and comprising a latch portion, the latch piece is configured to be rotated and be received in the sliding groove; and
   a data storage device configured to be slidably installed on the sliding groove;
   wherein the latch portion is configured to be resisted against the data storage device to secure the data storage device on the bracket.

2. The data storage device securing mechanism of claim 1, wherein the latch piece defines two pivot holes, the pivot shaft can be inserted into the two pivot holes to let the latch piece rotatably installed on the pivot shaft.

3. The data storage device securing mechanism of claim 2, wherein a pivot portion is defined between the two pivot holes, a torsion spring is set on the pivot shaft and is received in the pivot portion, the torsion spring can be elastically deformed to rotate the latch piece.

4. The data storage device securing mechanism of claim 3, wherein the torsion spring comprises two torsion arms respectively resisted against the bracket and the latch piece, one of torsion arm can be rotated to rotate the latch piece when the torsion spring is elastically deformed.

5. The data storage device securing mechanism of claim 1, wherein the bracket comprises two parallel securing plates, the sliding grooves are located on the securing plate.

6. The data storage device securing mechanism of claim 5, wherein one end of the bracket defines two receiving holes, the pivot shaft can be inserted into two receiving holes to be secured on the bracket.

7. The data storage device securing mechanism of claim 6, wherein a receiving cutout is defined between two receiving holes, two pivot holes and the torsion spring are received in the receiving cutout.

8. The data storage device securing mechanism of claim 5, wherein the securing plate defines a plurality of entrances communicated with the sliding groove, the data storage device can pass through the entrance to be inserted into the sliding groove.

9. The data storage device securing mechanism of claim 1, wherein the bracket further comprises a mounting portion, the mounting portion comprises a connector, the connector can be inserted into the data storage device to connect the data storage device.

10. The data storage device securing mechanism of claim 9, wherein the data storage device defines an interface, the connector is inserted into the interface to connect the storage device.

11. A data storage device combination, comprising:
    a data storage device;
    a bracket secured on a board, the bracket defining a sliding groove;
    a pivot shaft secured on the bracket; and
    a latch piece rotatably installed on the pivot shaft, the latch piece comprising a latch portion;
    wherein the data storage device is configured to be slidably installed on the sliding groove, the latch piece is configured to be rotated and be received in the sliding groove, and the latch portion is configured to be resisted against the data storage device to secure the data storage device on the bracket.

12. The data storage device combination of claim 11, wherein the latch piece defines two pivot holes, the pivot shaft can be inserted into the two pivot holes to let the latch piece rotatably installed on the pivot shaft.

13. The data storage device combination of claim 12, wherein a pivot portion is defined between the two pivot holes, a torsion spring is set on the pivot shaft and is received in the pivot portion, the torsion spring can be elastically deformed to rotate the latch piece.

14. The data storage device combination of claim 13, wherein the torsion spring comprises two torsion arms respectively resisted against the bracket and the latch piece, one of torsion arm can be rotated to rotate the latch piece when the torsion spring is elastically deformed.

15. The data storage device combination of claim 11, wherein the bracket comprises two parallel securing plates, the sliding grooves are located on the securing plate.

16. The data storage device combination of claim 15, wherein one end of the bracket defines two receiving holes, the pivot shaft can be inserted into two receiving holes to be secured on the bracket.

17. The data storage device combination of claim 16, wherein a receiving cutout is defined between two receiving holes, two pivot holes and the torsion spring are received in the receiving cutout.

18. The data storage device combination of claim 15, wherein the securing plate defines a plurality of entrances communicated with the sliding groove, the data storage device can pass through the entrance to be inserted into the sliding groove.

19. The data storage device combination of claim 11, wherein the bracket further comprises a mounting portion, the mounting portion comprises a connector, the connector can be inserted into the data storage device to connect the data storage device.

20. The data storage device combination of claim 19, wherein the data storage device defines an interface, the connector is inserted into the interface to connect the storage device.

* * * * *